(12) United States Patent
Graham

(10) Patent No.: US 9,390,725 B2
(45) Date of Patent: Jul. 12, 2016

(54) SYSTEMS AND METHODS FOR NOISE REDUCTION USING SPEECH RECOGNITION AND SPEECH SYNTHESIS

(71) Applicant: ClearOne Inc., Salt Lake City, UT (US)

(72) Inventor: Derek Graham, South Jordan, UT (US)

(73) Assignee: ClearOne Inc., Salt Lake City, UT (US)

( * ) Notice: Subject to any disclaimer, the term of this patent is extended or adjusted under 35 U.S.C. 154(b) by 0 days.

(21) Appl. No.: 14/788,869

(22) Filed: Jul. 1, 2015

(65) Prior Publication Data

US 2016/0064008 A1 Mar. 3, 2016

Related U.S. Application Data

(60) Provisional application No. 62/042,024, filed on Aug. 26, 2014.

(51) Int. Cl.
*G10L 21/02* (2013.01)
*G10L 21/0208* (2013.01)
(Continued)

(52) U.S. Cl.
CPC ........... *G10L 21/0208* (2013.01); *G10L 13/027* (2013.01); *G10L 15/26* (2013.01); *G10L 21/0264* (2013.01); *G10L 25/60* (2013.01); *G10L 2021/02087* (2013.01)

(58) Field of Classification Search
CPC ... G10L 15/20; G10L 21/0208; G10L 13/027; G10L 15/26; G10L 2021/02087; G10L 21/0264; G10L 25/60; B60R 1/12; B60R 2001/1215; H04R 3/005

USPC .......................................... 704/214, 220, 227
See application file for complete search history.

(56) References Cited

U.S. PATENT DOCUMENTS 6,119,086 A 9/2000 Ittycheriah et al.
6,161,091 A 12/2000 Akamine et al.
(Continued)

FOREIGN PATENT DOCUMENTS

DE 19927317 A1 12/2000
JP 10240283 A 9/1998
(Continued)

OTHER PUBLICATIONS

"The MBROLA Project", The MBROLA TTS engine and database builder, Available at http://tcts.fpms.ac.be/synthesis/mbrola.html.
(Continued)

*Primary Examiner* — Charlotte M Baker
(74) *Attorney, Agent, or Firm* — Matthew J. Booth & Associates PLLC; Matthew J. Booth

(57) ABSTRACT

The present disclosure describes a system (100) for reducing background noise from a speech audio signal generated by a user. The system (100) includes a user device (102) receiving the speech audio signal, a noise reduction device (118) in communication with a stored data repository (208), where the noise reduction device is configured to convert the speech audio signal to text; generate synthetic speech based on the converted text; optionally determine the user as an actual subscriber based on a comparison between the speech audio signal with the synthetic speech; and selectively transmit the speech audio signal or the synthetic speech based on comparison between the predicted subjective quality of the recorded speech and the synthetic speech.

20 Claims, 7 Drawing Sheets

(51) Int. Cl.
*G10L 13/027* (2013.01)
*G10L 15/26* (2006.01)
*G10L 21/0264* (2013.01)
*G10L 25/60* (2013.01)

(56) References Cited

U.S. PATENT DOCUMENTS

| | | | |
|---|---|---|---|
| 6,510,413 | B1 | 1/2003 | Walker |
| 6,876,968 | B2 | 4/2005 | Veprek |
| 7,308,407 | B2 | 12/2007 | Reich |
| 7,315,813 | B2 | 1/2008 | Kuo et al. |
| 7,590,540 | B2 | 9/2009 | Zhang et al. |
| 7,680,666 | B2 | 3/2010 | Manabe et al. |
| 7,716,056 | B2 | 5/2010 | Weng et al. |
| 7,761,296 | B1 | 7/2010 | Bakis et al. |
| 8,655,659 | B2 | 2/2014 | Wang et al. |
| 8,688,438 | B2 * | 4/2014 | Wee ............... G10L 13/047 704/214 |
| 2009/0157408 | A1 | 6/2009 | Kim |
| 2013/0238327 | A1 | 9/2013 | Nonaka |

FOREIGN PATENT DOCUMENTS

| | | |
|---|---|---|
| JP | 2003108180 A | 4/2003 |
| JP | 2004294813 A | 10/2004 |
| KR | 20010076625 A | 8/2001 |
| WO | 03021572 A1 | 3/2003 |
| WO | 2013163293 A1 | 10/2013 |

OTHER PUBLICATIONS

Holmes et al., "Speech Synthesis and Recognition", Taylor & Francis, Inc., Jan. 2002.
Malfrere et al., "Fully Automatic Prosody Generator for Text-to-Speech Synthesis", Proc. of Int. Conf. on Speech and Language Processing, 1998, pp. 1395-1398.
Mohsen et al., "Multi-Purpose Speech Recognition and Speech Synthesis System", IEEE Multidisciplinary Engineering Education Magazine, vol. 6, No. 4, Dec. 2011, pp. 22-27.
PC-KIMMO, "A Two-level Processor for Morphological Analysis", Retrieved on Jul. 9, 2015, 4 pages.
Sjolander, Kare, "The Snack Sound Toolkit", TMH/Software, 1997-2004.
Stylianou et al., "Applying the Harmonic Plus Noise Model in Concatenative Speech Synthesis", IEEE Transactions on Speech and Audio Processing, vol. 9, No. 1, Jan. 2001, pp. 21-29.
"TTSBOX: A Matlab-based tutorial toolbox for teaching Text-to-Spech synthesis to undergraduate and graduate students", Available at http://tcts.fpms.ac.be/projects/ttsbox/, retrieved on Jul. 9, 2015, 2 pages.
Jurafsky et. al., "Speech and Language Processing" Prentice Hall, Apr. 2008.
Dutoit, Thierry, "Introduction to Text-to-Speech Synthesis", vol. 1-3, Springer-Verlag New York, LLC.
Microsoft Research, "Microsoft Audio Watermarking Tool", Available at <http://research.microsoft.com/enus/downloads/885bb5c4-ae6d-418b-97f9-adc9da8d48bd/default.aspx>, retrieved on Jul. 10, 2015, 1 page.

* cited by examiner

SYSTEMS AND METHODS FOR NOISE REDUCTION USING SPEECH RECOGNITION AND SPEECH SYNTHESIS

CROSS REFERENCES TO RELATED APPLICATIONS

This application claims priority and the benefits of the earlier filed Provisional U.S. No. 62/042,024, filed 26. Aug. 2014, which is incorporated by reference for all purposes into this specification.

TECHNICAL FIELD

The present disclosure generally relates to noise reduction, and more particularly to systems and methods for noise reduction using speech recognition and speech synthesis.

BACKGROUND ART

Various noise reduction techniques are currently available to enhance speech containing background noise in a diversity of applications including those related to communication and control. One such technique is called Spectral Subtraction (See, "S. Boll, Suppression of acoustic noise in speech using spectral subtraction." IEEE Transactions on Acoust. Speech and Signal Processing, Vol. 27, (1979) pp. 1109-1121.) This technique involves estimating the power spectrum of the noise and subtracting the estimated noise power spectrum from the speech plus noise power spectrum. This technique suffers from a problem called musical artifacts. Another technique involves estimation of the clean speech spectral magnitude from a noisy speech spectrum using an optimal minimum mean squared estimator based on the Ephraim and Malah algorithm (See Y. Ephraim and D. Malah, "Speech enhancement using optimal nonlinear spectral amplitude estimation," in Proc. IEEE Int. Conf. Acoust. Speech Signal Processing (Boston), 1983, pp. 1118-1121. and Y. Ephraim and D. Malah, "Speech enhancement using a minimum means-square error log-spectral amplitude estimator," IEEE Trans. Acoust. Speech Signal Processing, vol. ASSP-33, no. 2, pp. 443-445, 1985.). All of these techniques suffer from the problem that as the signal to noise ratio decreases (i.e. the noise power increases relative to the speech power), the enhanced speech sounds more unnatural and distorted. At some point, a listener might actually prefer to simply listen to the noisy speech rather than the badly distorted "enhanced" speech.

Therefore, there exists a need for improved systems and methods that reduce background noise for speech enhancement.

SUMMARY OF INVENTION

This disclosure describes systems and methods for noise reduction using speech recognition and speech synthesis. This disclosure provides a system using a user device in communication with a stored data repository, that reduces the background noise from a speech audio signal generated by a user. The user device includes a processor and a memory and receives a speech audio signal. The system additionally includes a noise reduction device, in communication with a stored data repository, and in communication with the user device, where the noise reduction device is configured to: convert the received speech audio signal to text; generate synthetic speech based on a speech data corpus or speech model data of the user stored in the stored data repository and the converted text; determine the predicted subjective quality of the received speech audio signal if that signal were to be transmitted to a far end listener; determine the predicted subjective quality of the synthetic speech; and transmit, selectively, the speech audio signal or the synthetic speech, whichever has higher predicted quality based on a comparison between the value of objective quality metrics computed for the speech audio signal and the synthetic speech signal.

Additionally, this disclosure provides that the stored data repository is on the user device and or a server via a network.

Additionally, this disclosure provides that the received speech audio signal is a live speech audio signal.

Further, this disclosure provides that the user device is configured to pre-process the speech audio signal based on using a predetermined noise reduction algorithm.

And, this disclosure further provides that the noise reduction device is integrated with the user device.

Other and further aspects and features of the disclosure will be evident from reading the following detailed description of the embodiments, which are intended to illustrate, and not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

Figure 1A:
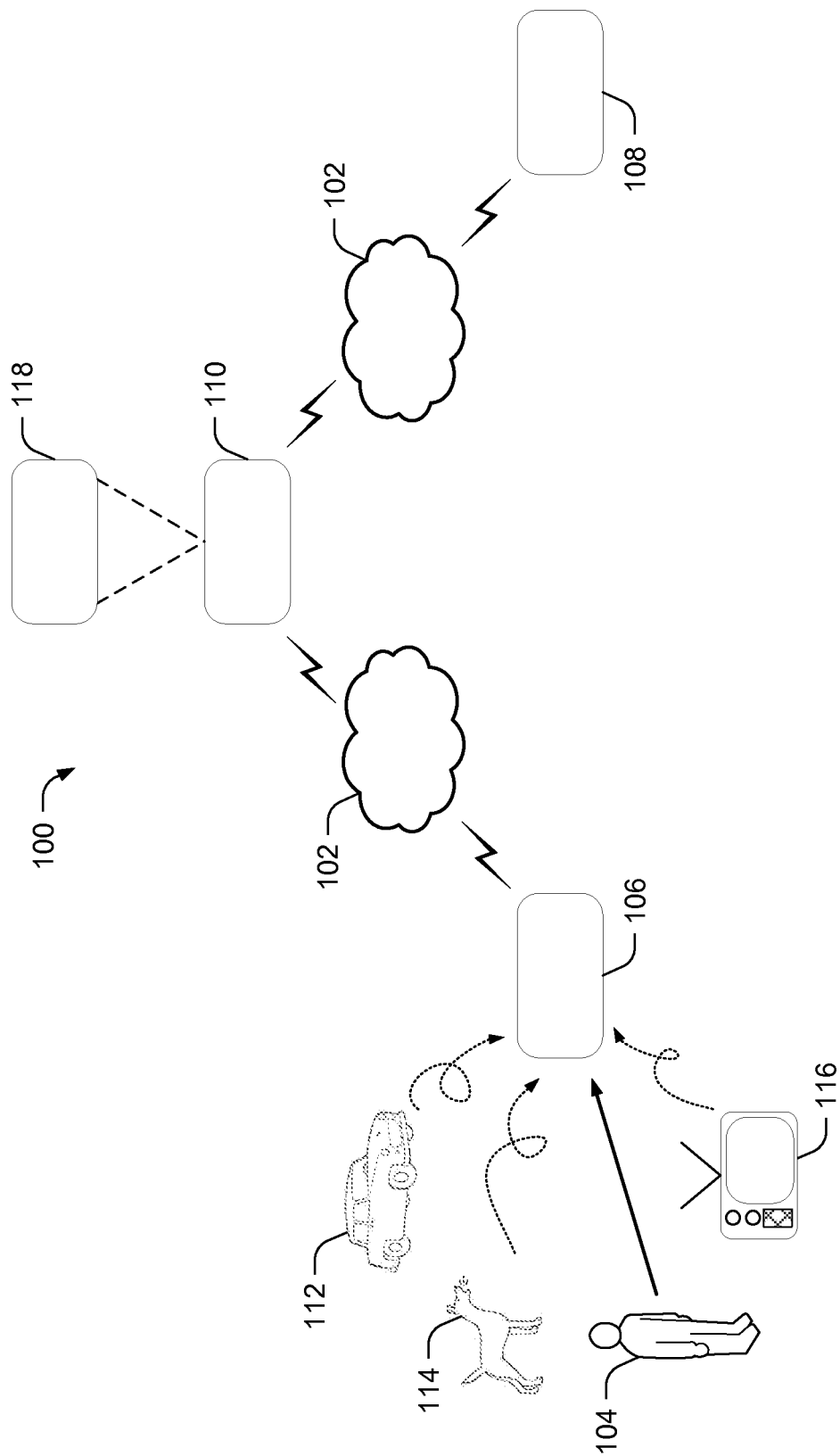
FIGS. 1A, 1B, 1C, and 1D illustrate environments that implement multiple embodiments of the disclosed invention.

This disclosure describes a method for performing noise reduction using speech recognition and speech synthesis. This disclosure describes numerous specific details in order to provide a thorough understanding of the present invention. One skilled in the art will appreciate that one may practice the present invention without these specific details. Additionally, this disclosure does not describe some well-known items in detail in order not to obscure the present invention.

FIGS. 1A, 1B, 1C, and 1D are schematics that illustrate a system 100 for implementing an exemplary noise reduction device 118, according to several embodiments of the present disclosure. Embodiments are disclosed in the context of use of speech for communication, voice dialing, device control, or data entry, over a network 102 in a noisy environment such as a playground. In the illustrated system 100, a user 104 may communicate with another user using a first communication device 106 and a second communication device 108 respectively via a server 110 over a network 102. The first communication device 106 and the second communication device 108 may be implemented as any of a variety of computing devices (e.g., a server 110, a desktop PC, a notebook, a workstation, a personal digital assistant (PDA), a mainframe computer, a mobile computing device, an internet appliance, etc.) and calling devices (e.g., a telephone, an internet phone, etc.). The first communication device 106 may be compatible with the second communication device 108 to exchange audio signals with each other or any other compatible devices. Each of the first communication device 106 and the second communication device 108 may be located at the same or different locations.

In one embodiment, the first communication device 106 may be a mobile phone receiving a speech audio signal from the user 104. In another embodiment, the first communication device 106 may be a headset worn by the pilot of an aircraft such as a helicopter which is used to communicate with other passengers in the same aircraft or personnel on the ground. The speech audio signal may include background noises from various sound sources, e.g., another person, transportation vehicles such as a car 112, an animal such as a dog 114, a television 116, etc. In some embodiments, the background noise may include non speech sounds, e.g., humming; finger clicks, claps, etc. being produced by the user 104 or in the ambient surrounding. The speech audio signal may include a set of specific words in a predetermined language having predefined speech sounds called phonemes. In some embodiments, the speech audio signal may be received live from the user 104. The communication devices 106 and 108 may include one or more processors and various types of memory and storage devices that are typically found in user communication devices and user computing devices.

In some embodiments, a user device such as the first communication device 106 and the second communication device 108 may implement a variety of noise reduction techniques (which are also synonymously called speech enhancement techniques) known in the art, related art, or developed later including the Ephraim and Malah algorithm for speech enhancement. For example, the first communication device 106 may pre-process the speech audio signal using such noise reduction techniques for sending a pre-processed speech to the noise reduction device 118 or a server 110 implementing the noise reduction device 118. In some embodiments, the pre-processed speech may have relatively lesser noise compared to the speech audio signal.

The server 110 may be implemented as any of a variety of computing devices including, for example, a general purpose computing device, multiple networked servers (arranged in clusters or as a server farm), a mainframe, or so forth. In one embodiment, the server 110 may be installed, integrated, or operatively associated with a noise reduction device 118 configured to reduce noise from the audio signal for speech, hereinafter also referred to as speech audio signal, using speech recognition and speech synthesis. The server 110 may include one or more processors and various types of memory and storage devices that are typically found in servers and other computing devices.

The noise reduction device 118 may represent any of a wide variety of devices capable of providing noise reduction services for network 102 devices. The noise reduction device 118 may be implemented as a standalone and dedicated device including hardware and installed software, where the hardware is closely matched to the requirements and/or functionality of the software. Alternatively, the noise reduction device 118 may be implemented as a software application or a device driver. The noise reduction device 118 may enhance or increase the functionality and/or capacity of the network 102, such as the network 102, to which it is connected. In some embodiments, the noise reduction device 118 may be configured to expose its computing environment or operating code to a user, and may include related art I/O devices, such as a keyboard or display. The noise reduction device 118 of some embodiments may, however, include software, firmware, or other resources that support remote administration and/or maintenance of the noise reduction device 118.

In further embodiments, the noise reduction device 118, either in communication with any of the networked devices, such as the first communication device 106 and the second communication device 108, or independently, may have video, voice, and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware capable of facilitating video, voice, or data communications, in any combination thereof. In some embodiments, the noise reduction device 118 may comprise or implement one or more real time protocols and non-real time protocols known in the art, related art, or developed later to facilitate speech data transfer among the first communication device 106, the second communication device 108, the server 110, the noise reduction device 118, or any other network devices.

In some embodiments, the noise reduction device 118 may be configured to convert communications, which may include instructions, conversation, queries, data, etc., from the first communication device 106 into appropriate formats to make these communications compatible with the second communication device 108, and vice versa. Consequently, the noise reduction device 118 may allow implementation of the first communication device 106 or the server 110 using different technologies or by different organizations, e.g., a third-party vendor, managing the first communication device 106, or the server 110, or associated services using a proprietary technology.

Figure 1B:
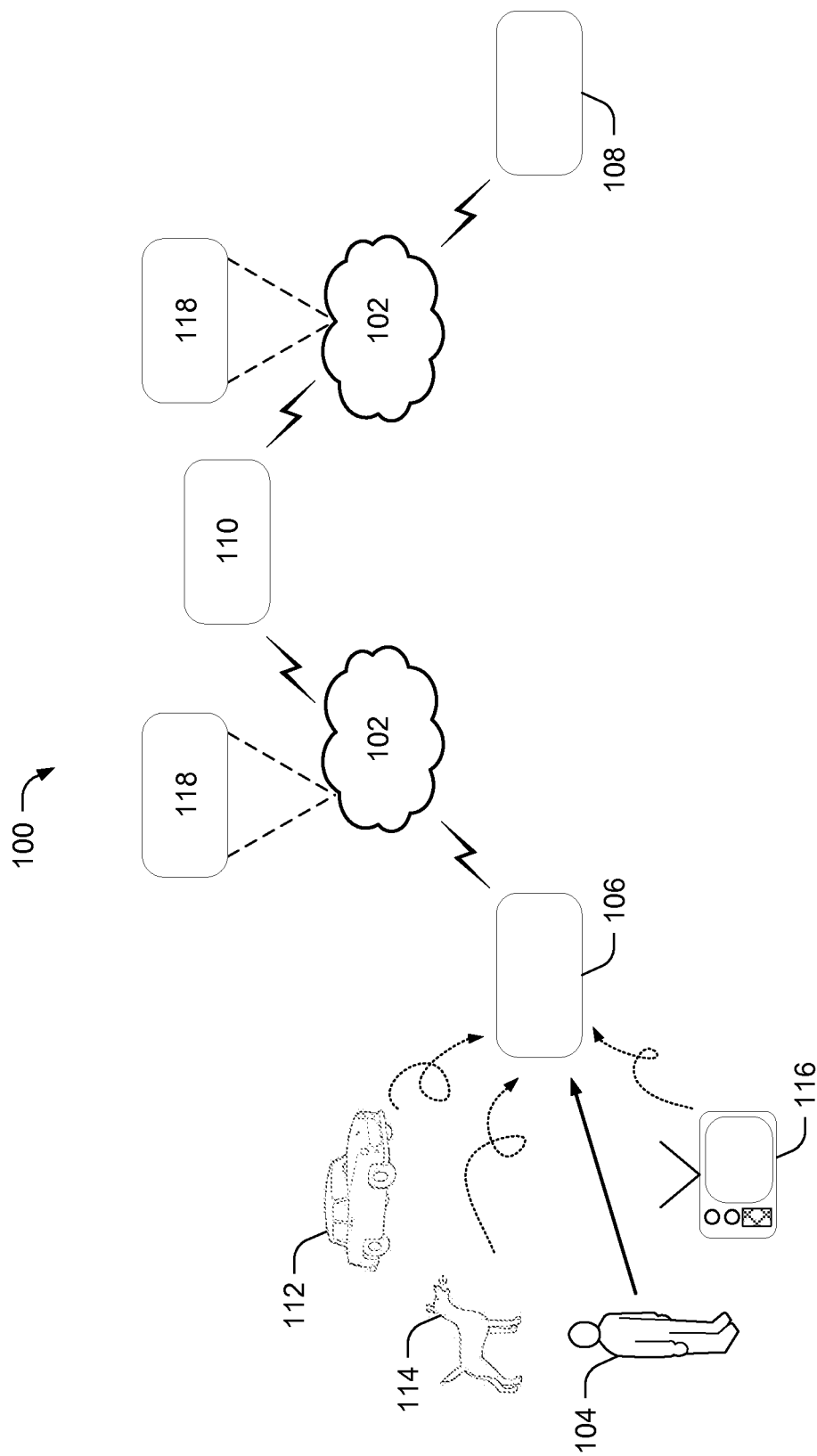

In some embodiments as illustrated in FIG. 1B, the noise reduction device 118 may be installed on or integrated with a network appliance (not shown) configured to establish the network 102 between the first communication device 106 and the second communication device 108. At least one of the noise reduction device 118 and the network appliance may be capable of operating as or providing an interface to assist exchange of software instructions and data among the first communication device 106, the second communication device 108, and the noise reduction device 118. In some embodiments, the network appliance may be preconfigured or dynamically configured to include the noise reduction device 118 integrated with other devices. Examples of the network appliance include, but are not limited to, a DSL modem, a wireless access point, a router, a base station, and a gateway having a predetermined computing power and memory capacity sufficient for implementing the noise reduction device 118.

In another embodiment, the noise reduction device 118 may be integrated with the server 110 as shown in FIG. 1A or any other computing device (not shown) connected to the network 102. The server 110 may include a module (not shown), which enables the server 110 to provide a list of available services to the network appliance, thereby enabling the network appliance to invoke the noise reduction device 118 as a service.

Figure 1C:
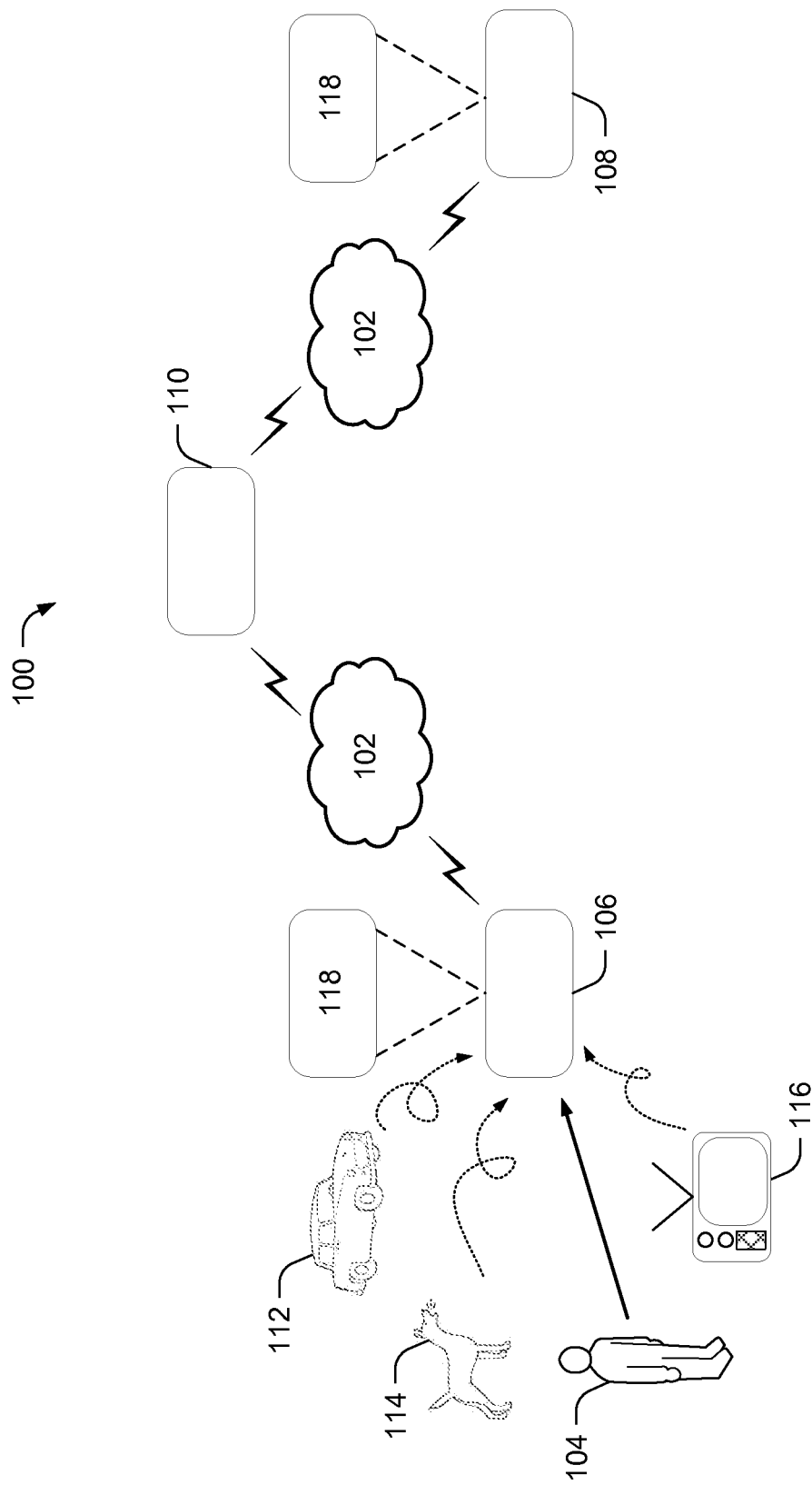

In another embodiment as shown in FIG. 1C, the noise reduction device 118 may be integrated with the communication devices 106 and or 108.

Figure 1D:
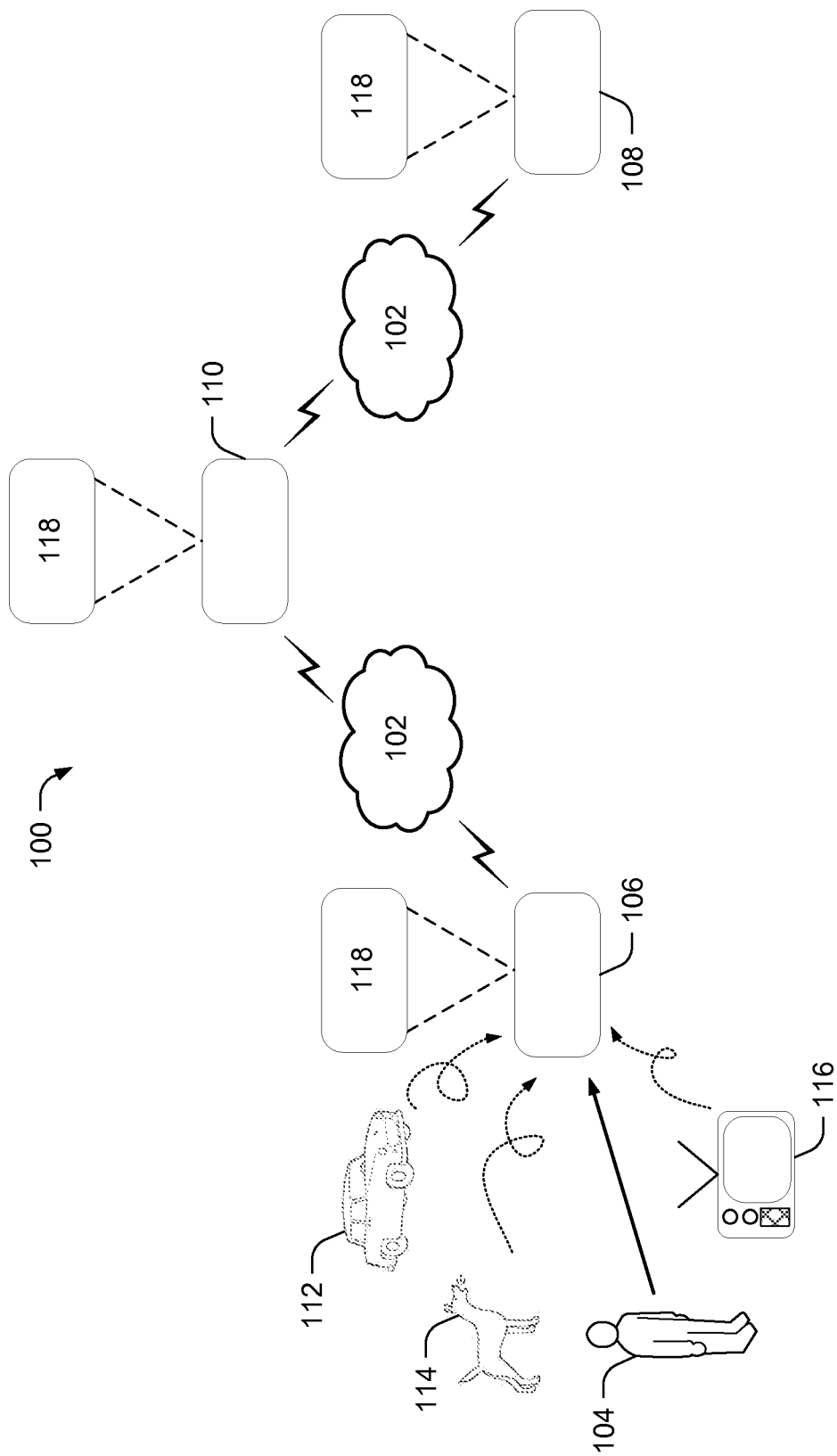

And in another embodiment as shown in FIG. 1D, the noise reduction device 118 may be integrated into any number of devices in a distributed fashion such as being integrated into communication devices 106 and 108 and in server 110.

Figure 2:
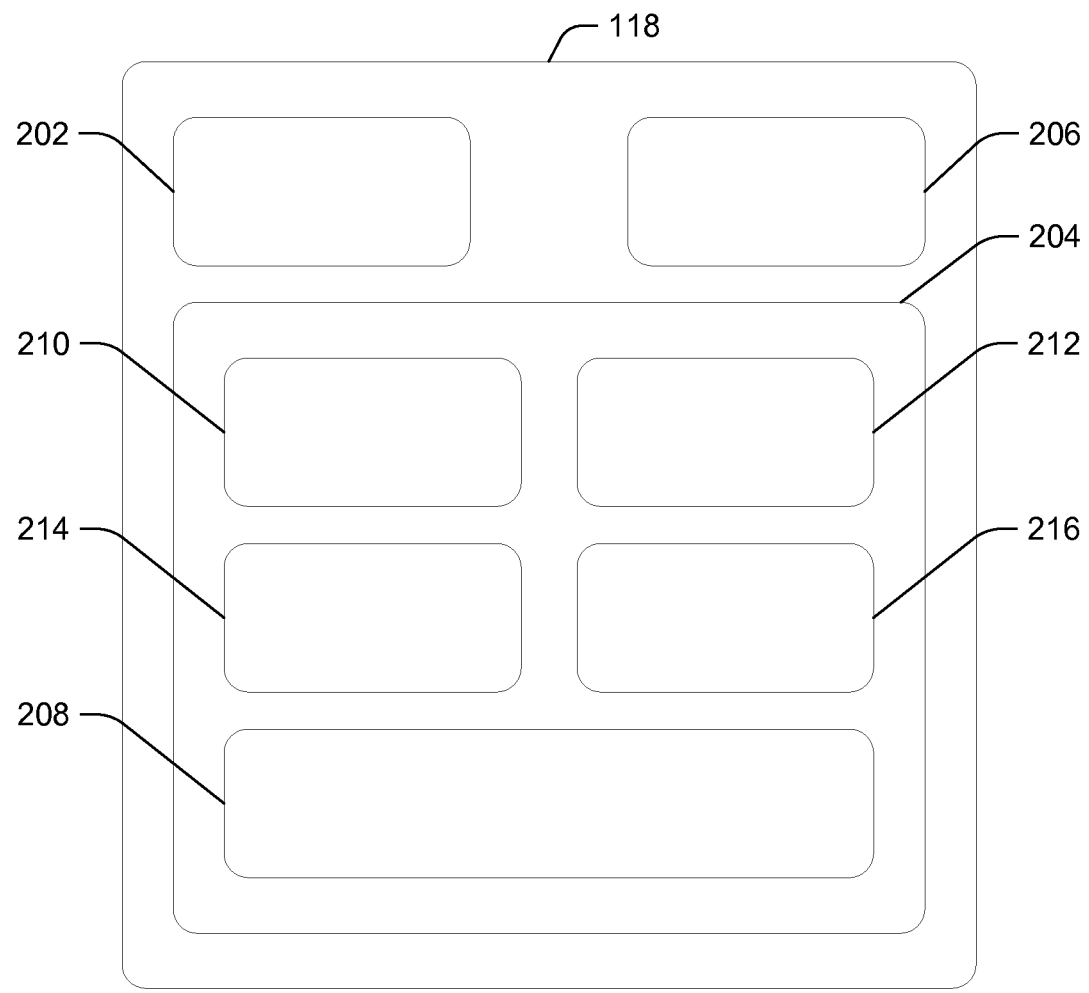
FIG. 2 illustrates the noise reduction device of FIGS. 1A-1D, according to an embodiment of the present disclosure.

As illustrated in FIG. 2, the noise reduction device 118 may be configured to reduce the background noise from the speech audio signal received from a user device such as the first communication device 106 based on speech recognition and speech synthesis. The speech audio signal may include speech of the user 104 and background noise comprising of any unwanted sound such as those mentioned above including a speech of another user. In some embodiments, such noise reduction may be implemented as a service over the network 102 for subscribed users.

The noise reduction device 118 may be implemented by way of a single device (e.g., a computing device, a processor or an electronic storage device) or a combination of multiple devices that are operatively connected or networked together. The noise reduction device 118 may be implemented in hardware or a suitable combination of hardware and software. In some embodiments, the noise reduction device 118 may be a hardware device including processor(s) 202 executing machine readable program instructions for analyzing data, and interactions between the first communication device 106 and the second communication device 108. The hardware may comprise a combination of discrete components, an integrated circuit, an application-specific integrated circuit, a field programmable gate array, a digital signal processor, or other suitable hardware. The software may comprise one or more objects, agents, threads, lines of code, subroutines, separate software applications, two or more lines of code or other suitable software structures operating in one or more software applications or on one or more processors. The processor(s) 202 may include, for example, microprocessors, microcomputers, microcontrollers, digital signal processors, central processing units, state machines, logic circuits, and/or any devices that manipulate signals based on operational instructions. Among other capabilities, the processor(s) 202 may be configured to fetch and execute computer readable instructions in the memory 204 associated with the noise reduction device 118 for performing tasks such as signal coding, data processing input/output processing, power control, and/or other functions.

In some embodiments, the noise reduction device 118 may include, in whole or in part, a software application working alone or in conjunction with one or more hardware resources. Such software applications may be executed by the processor(s) 202 on different hardware platforms or emulated in a virtual environment. Aspects of the noise reduction device 118 may leverage known, related art, or later developed off-the-shelf software. Other embodiments may comprise the noise reduction device 118 being integrated or in communication with a mobile switching center, network 102, gateway system, Internet access node, application server, IP Multimedia Core Network Subsystem (IMS) core, service node, or some other communication systems, including any combination thereof. In some embodiments, the noise reduction device 118 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The noise reduction device 118 may include a variety of known, related art, or later developed interface(s) 206, including software interfaces (e.g., an application programming interface, a graphical user interface, etc.); hardware interfaces (e.g., cable connectors, a keyboard, a card reader, a barcode reader, a biometric scanner, a microphone, an interactive display screen, etc.); or both.

The noise reduction device 118 may further include the memory 204 for storing at least one of (1) a log of profiles of network devices, device owners, and associated communications including instructions, queries, conversations, data, and related metadata; (2) one or more subscribers of a predefined service (e.g., a noise reduction service, etc.) being provided by or implemented on the network 102; (3) speech data corpus of the one or more users or subscribers; and (4) predefined models, equations, algorithms, etc. for speech recognition and speech synthesis.

The system memory 204 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The system memory 204 may include one or more stored data repositories 208 such as a database and/or a file system 208, which may be sub-divided into further databases and/or files for storing electronic files. The system memory 204 may have one of many database schemas known in the art, related art, or developed later for storing speech data, such as speech data corpus, from the first communication device 106 via the noise reduction device 118. For example, the stored data repository 208 may have a relational database schema involving a primary key attribute and one or more secondary attributes. In some embodiments, the noise reduction device 118 may perform one or more operations, but not limited to, reading, writing, indexing, labeling, updating, and modifying the data, and may communicate with various networked computing devices.

In one embodiment, the system memory 204 may include various modules such as a recording module 210, a synthetic speech module 212, a speaker verification module 214, and a noise reduction module 216. The recording module 210 may receive a speech audio signal including background noise from a user device such as the first communication device 106 over the network 102. In some embodiments, the speech audio signal may be pre-processed at the first communication device 106 for noise reduction using a variety of techniques known in the art, related art, or developed later. The speech audio signal may belong to a user such as the user 104 capable of subscribing to a predefined service such as the noise reduction service provided by or implemented on the network 102.

The recording module 210 may include a predefined threshold of the signal-to-noise ratio (SNR), hereinafter referred to as predefined SNR threshold, for the received speech audio signal. In one embodiment, the recording module 210 may be configured to record the speech audio signal having an acceptable SNR, which is above the predefined SNR threshold. Such speech audio signal may be recorded over time while the user device such as the first communication device 106 is being used, in some embodiments, in a relatively quiet environment. The recorded speech audio signal may be stored in the stored data repository 208 as such or after being converted into text, or both. Alternatively, the recorded speech may be analyzed by algorithms running on the processor 202 in order to extract relevant features from the speech, analyze those features, and store appropriate limits for, and statistical information about, those features in the stored data repository represented as a file. The features stored in the file may be used to construct a vocal tract and excitation model to be used by an algorithmic speech synthesizer.

In some embodiments, the user 104 may record the speech audio signal at a user device, such as the first communication device 106, in a relatively quiet environment. Such recorded speech audio signal, in one example, may be converted into text for the purpose of collecting a speech data corpus, at the user device such as the first communication device 106 over time. Once a sufficiently large speech data corpus is collected, the user device may send the collected speech data corpus to the recording module 210 for being stored in the stored data repository 208.

In some embodiments, the converted text may be tagged with a label, e.g., based on inherent part of speech (POS) and noun phrases using any of a variety of natural language processing (NLP) techniques known in the art, related art, or developed later such as conditional random field models. Tagging may allow segments of recorded speech audio signal to be matched with the converted text so that sub-word segments can be captured in the stored data repository 208. Such textual speech data may be accumulated over time to create a speech data corpus for the user 104 in the stored data repository 208.

The synthetic speech module 212 may be configured to generate synthetic speech using the speech data corpus stored in the stored data repository 208 for various users subscribing to the noise reduction service; hereinafter such users are referred to as service subscribers. In one embodiment, the speech data corpus for various service subscribers may be stored as recorded speech plus transcribed text in the stored data repository 208.

The synthetic speech module 212 then may determine how to pronounce a sequence of words of the converted text by determining what part of speech each word can be classified into and how the words are organized into logical groups. For example, the correct pronunciation of the words "record", "permit", and "present" depends heavily on how the word is used in a specific sentence. At this point, the output is a set of "graphemes" or letters of the alphabet plus information on how each word should be pronounced. If the original recorded speech is not excessively degraded by noise, a pitch contour can be extracted from the speech and can be given as input to the speech synthesizer in order to improve the realism of the synthetic speech.

The graphemes or the stream of data that describes how a word should be pronounced may be taken and a set of phonemes may be selected from a recorded database of speech sounds that may be used to speak the word aloud. Phonemes are the set of speech sounds available for use in a particular language. Further, the synthetic speech module 212 may determine prosody information that describes elements like emphasis, pauses, and pitch for a set of phonemes.

In some embodiments, the synthetic speech module 212 may implement a variety of techniques known in the art, related art, or developed later for generating synthetic speech based on determined prosody information including the algorithmic synthesis method. In one instance, the synthetic speech module 212 may implement the concatenative synthesis method that uses a recorded database of speech sounds (diphones or triphones) and concatenates the correct pieces of speech sounds or phonemes to generate continuous speech. Pitch and timing modifications may be included to make the speech sound more natural. Additionally, the synthetic speech module 212 may generate synthetic speech using the converted text of the received speech audio signal stored in the stored data repository 208 for the received speech audio signal. The generated synthetic speech may be sent to the noise reduction module 216 for use or stored in the stored data repository 208.

In some embodiments, the synthetic speech module 212 may audio-watermark the generated synthetic speech, so that it can be verified by the noise reduction module 216, or any other network module or device, to be synthetic rather than the received speech audio signal.

In some embodiments, the speaker verification module 214 may be configured to automatically determine whether or not the user 104 whose speech audio signal is received from the first communication device 106 is the actual service subscriber. In one embodiment, the speaker verification module 214 may compare the speech audio signal, as received by the recording module 210 from the user device, with the synthetic speech generated using the speech data corpus of the user 104 stored in the stored data repository 208 by the synthetic speech module 212 for. A positive match based on such comparison may confirm the verification of the user 104 who corresponds to the received speech audio signal, who is the actual subscriber of the predefined service, e.g., noise reduction service, provided by or implemented on the network 102.

Additionally, the speaker verification module 214 may be configured to determine the identity of the user 104 using a variety of speaker verification techniques known in the art, related art, or developed later. For example, the speaker verification module 214 may compute the Itakura-Saito distance between the spectrum of the synthetic speech generated by the synthetic speech module 212 for the target service subscriber stored in the stored data repository 208 and the spectrum of the speech audio signal received from a user such as the user 104.

The textual speech data of the received speech audio signal for the user 104, identified as the speaker, may be stored in the collected speech data corpus for that user 104 in the stored data repository 208.

The noise reduction module 216 may receive the synthetic speech generated for the received speech audio signal from the synthetic speech module 212. In one embodiment, the noise reduction module 216 may be configured to objectively estimate the quality of the unprocessed received speech audio signal and the synthetic speech generated for this speech audio signal and choose which signal to send to the remote listener. In another embodiment, the noise reduction module may be configured to estimate the quality of the unprocessed received speech audio signal, and in addition, estimate the quality of the speech audio signal processed by a traditional noise reduction (or equivalently speech enhancement) system, and finally estimate the quality of the synthetic speech and choose the best out of the three options. The noise reduction module 216 may perform such objective quality estimation by using the non-intrusive quality measurement method standardized by the Telecommunication Standardization Sector of the International Telecommunications Union (ITU-T) called ITU-T standard P.563, "Single-ended method for objective speech quality assessment in narrow-band telephony applications". This standard was developed as a way to monitor the quality of telecommunication links. After it was developed, it was evaluated as a way to objectively measure the quality of synthetic speech (See "Ivan Kraljevski et. al., "Synthesized Speech Quality Evaluation Using ITU-T P.563", $18^{th}$. Telecommunications forum TELFOR 2010, p. 590-593). As an alternative to ITU-T P.563, the noise reduction module could use the Low Complexity Quality Assessment (LCQA) algorithm (See Volodya Grancharov et. al., "Low-Complexity, Nonintrusive Speech Quality Assessment", IEEE Transactions on Audio, Speech, and Language Processing, vol. 14, #6) which gives results that correlate more closely with the Mean Opinion Scores given by human listeners than P.563. and also requires less computation. Based on the comparison of scores provided by the P.563. or LCQA algorithms, one of the received speech audio signal and the synthetic speech that has a higher score may be determined as the output signal by the noise reduction module 216. The determined output signal may be sent as a noise-reduced speech audio signal to the second communication device 108 over the network 102, provided the user 104 is determined as the actual subscriber of the predefined service, e.g., noise reduction service, by the speaker verification module 214.

Figure 3:
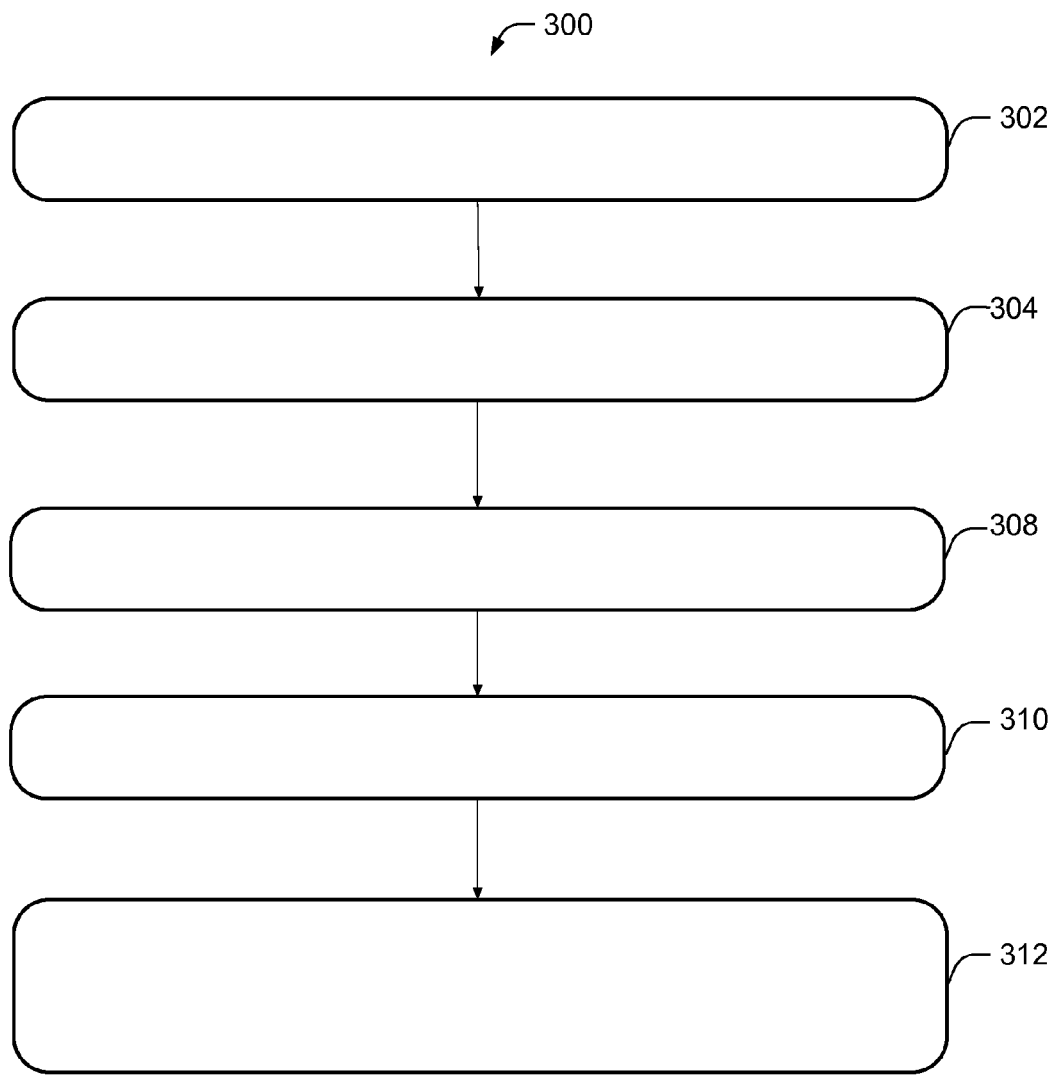
FIG. 3 is a flowchart illustrating a first exemplary method being implemented by the noise reduction device of FIGS. 1A-1D, according to an embodiment of the present disclosure.

FIG. 3 is a flowchart illustrating a first exemplary method being implemented by the noise reduction device 118 of FIG. 1, according to an embodiment of the present disclosure. The exemplary method 300 may be described in the general context of computer executable instructions. Generally, computer executable instructions may include routines, programs, objects, components, data structures, procedures, modules, functions, and the like that perform particular functions or implement particular data types. The computer executable instructions may be stored on a computer readable medium, and installed or embedded in an appropriate device for execution.

The order in which the method 300 is described is not intended to be construed as a limitation, and any number of the described method blocks may be combined or otherwise performed in any order to implement the method, or an alternate method. Additionally, individual blocks may be deleted from the method without departing from the spirit and scope of the present disclosure described herein. Furthermore, the method 300 may be implemented in any suitable hardware, software, firmware, or combination thereof, that exists in the related art or that is later developed.

The method 300 describes, without limitation, implementation of the exemplary noise reduction device 118. Those having ordinary skill in the art would understand that the method 300 may be modified appropriately for implementation in a various manners without departing from the scope and spirit of the disclosure.

At step 302, a speech audio signal including background noise is received. The noise reduction module 216 may receive the speech audio signal from a user device over a network 102. The speech audio signal may include background noise of different types from a variety of sound sources such as those discussed above. The speech audio signal may belong to the user and include a set of specific words in a predetermined language in the voice of the user 104. In one embodiment, the speech audio signal may be received live from the user 104 via the user device, such as the first communication device 106, aimed to be processed and sent to the second communication device 108. In another embodiment, the speech audio signal may be pre-processed by the user device using any of the variety of noise reduction techniques known in the art, related art, or developed later to reduce some portion of the background noise before the speech audio signal is received by the noise reduction device 118. In a further embodiment, the user 104 may record the speech audio signal at the user device, such as the first communication device 106, in a relatively quiet environment. Such recorded speech audio signal may be converted into text for the purpose of collecting a speech data corpus at the user device over time. Once a sufficiently large speech data corpus is collected, the user device may send the collected speech data corpus, e.g., textual speech data aligned with recorded speech audio signals, to the recording module 210 of the noise reduction device 118, and stored in the stored data repository 208.

At step 304, the received speech audio signal may be converted to text in response to the objective quality measurement of the received speech audio signal being above a predefined quality threshold. The received speech audio signal may be converted into text or textual speech data, which may be stored in the stored data repository 208. In some embodiments, similar textual speech data plus speech audio signals may be accumulated or retrieved from the user device, if available, over time to create a speech data corpus for the user 104. In some embodiments, the user device such as the first communication device 106 or the noise reduction device 118 may allow the user 104 to operate the user device, e.g., the first communication device 106, for controlling such conversion of the speech audio signal into text occurring at the noise reduction device 118.

In one embodiment, the synthetic speech module 212 may access the speech data corpus stored in the stored data repository 208 for the user 104 providing the speech audio signal. Such speech data corpus may include the textual speech data time aligned with recorded speech audio signals corresponding to a service subscriber for speech synthesis.

At step 308, the user is determined as an actual service subscriber based on a comparison between the received speech audio signal and the synthetic speech. In one embodiment, the speaker verification module 214 may compare the received speech audio signal with the synthetic speech. As multiple speech audio signals belonging to one or more users may be received in a single session, e.g., a communication session, such comparison may allow the system to determine whether or not the user 104 whose speech audio signal is received is the actual service subscriber. Based on a positive match between the synthetic speech and the received speech audio signal, the speaker verification module 214 may determine that the user 104 is the actual service subscriber. This step is not required if the communication system requires a user to log in before using the system.

At step 310, a second quality measurement of the generated second synthetic speech is determined. The noise reduction module 216 may determine a quality metric of the synthetic speech generated using the converted text from the speech audio signal by the synthetic speech module 212.

At step 312, at least one of the received speech audio signal and the synthetic speech, whichever has relatively higher predicted subjective quality may be transmitted based on a comparison between the first quality measurement and the second quality measurement, optionally provided the user is determined as the actual service subscriber.

Figure 4:
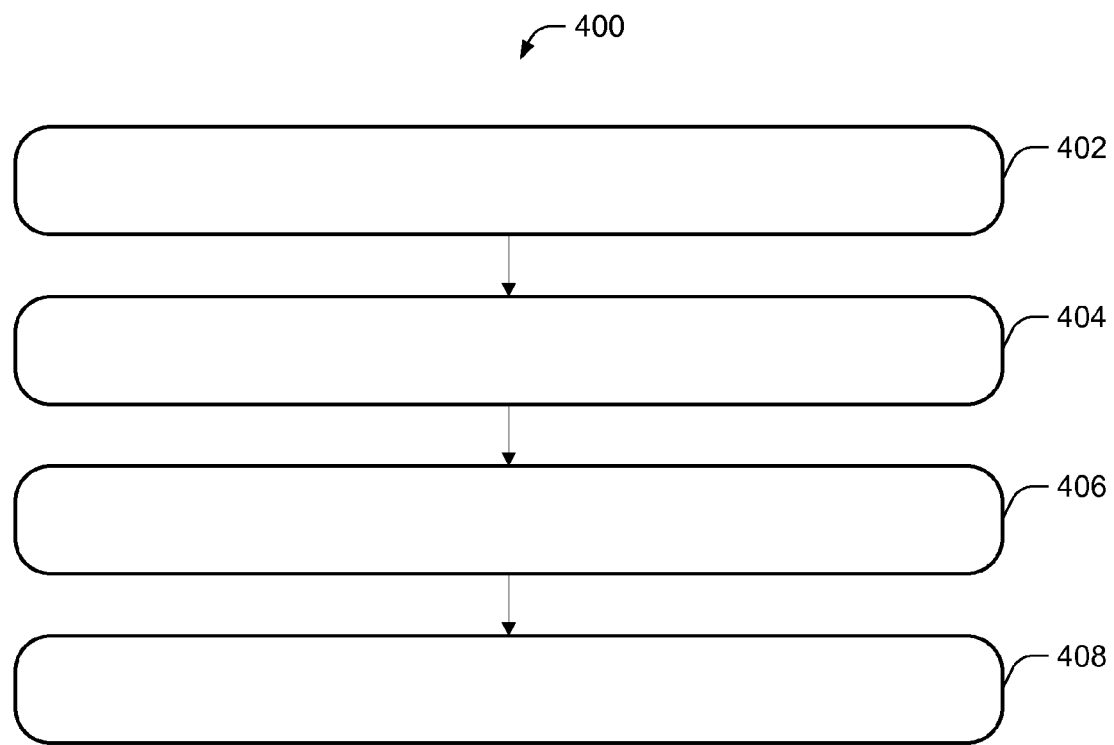
FIG. 4 is a flowchart illustrating a second exemplary method being implemented by the noise reduction device of FIGS. 1A-1D, according to an embodiment of the present disclosure.

FIG. 4 is a flowchart illustrating a second exemplary method being implemented by the noise reduction device 118 of FIG. 1, according to an embodiment of the present disclosure.

The exemplary method 400 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 400 is described is not intended to be construed as a limitation, and any number of the described method blocks may be combined or otherwise performed in any order to implement the method, or an alternate method. Additionally, individual blocks may be deleted from the method without departing from the spirit and scope of the present disclosure described herein. Furthermore, the method 400 may be implemented in any suitable hardware, software, firmware, or combination thereof, that exists in the related art or that is later developed.

The method 400 describes, without limitation, implementation of the exemplary noise reduction device 118. One of skill in the art will understand that the method 400 may be modified appropriately for implementation in various manners without departing from the scope and spirit of the disclosure.

At step 402, a speech model for the target user may be retrieved from a database or file. In one embodiment, the speaker verification module 214 may retrieve a speech model for a target user stored in the stored data repository 208. The speech model may be created by the recording module 210 using standard methods to extract relevant features from the speech recording along with a data clustering algorithm like the well-known K-means algorithm. The extracted features may include mel-frequency cepstral coefficients (MFCCs) (see, Tomi Kinnunen, et. al., "An Overview of Text-Independent Speaker Recognition: from Features to Supervectors", Speech Communication, Vol. 52, #1, January 2010, pp. 12-40) corresponding to a speech audio signal from the user 104 or retrieved from the user device over a period of time. At step 404, a likelihood ratio can be computed using a Gaussian Mixture Model (GMM) to determine the likelihood that the current talker is the service subscriber. Alternatively, an artificial neural network (ANN) (see generally, S. Haykin, *Neural Networks: A Comprehensive Foundation*, Second Edition 1999) such as a multilayer perceptron could be used (see J. M. Naik, et. al., "A hybrid HMM-MLP speaker verification algorithm for telephone speech," in Proc. IEEE Int. Conf. Acoustics, Speech, Signal Processing (ICASSP '94) VOL. 1, PP. 153-156, Adelaide, Australia, April 1994.). At step 406, a user or a service subscriber may be verified to be the target service subscriber based on the likelihood ratio being above a predetermined threshold, or the Neural Network providing a positive classification. At step 408, at least a portion of the received speech audio signal or relevant features extracted from the speech audio signal corresponding to the user or service subscriber identified as the speaker may be stored with the speech corpus for that user such as the user 104 in the stored data repository.

To summarize, this disclosure describes systems and methods for noise reduction using speech recognition and speech synthesis. This disclosure provides a system using a user device in communication with a stored data repository, that reduces the background noise from a speech audio signal generated by a user. The user device includes a processor and a memory and receives a speech audio signal. The system additionally includes a noise reduction device, in communication with a stored data repository, and in communication with the user device, where the noise reduction device is configured to: convert the received speech audio signal to text; generate synthetic speech based on a speech data corpus of the user stored in the stored data repository and the converted text; determine the predicted subjective quality of the received speech audio signal if that signal were to be transmitted to a far end listener; determine the predicted subjective quality of the synthetic speech; and transmit, selectively, the speech audio signal or the synthetic speech, whichever has higher predicted quality based on a comparison between the value of objective quality metrics computed for the speech audio signal and the synthetic speech signal.

Additionally, this disclosure provides that the stored data repository is on the user device and or a server via a network. Additionally, this disclosure provides that the received speech audio signal is a live speech audio signal. Further, this disclosure provides that the user device is configured to pre-process the speech audio signal based on using a predetermined noise reduction algorithm. And, this disclosure further provides that the noise reduction device is integrated with the user device.

Other embodiments of the present invention will be apparent to those skilled in the art after considering this disclosure or practicing the disclosed invention. The specification and examples above are exemplary only, with the true scope of the present invention being determined by the following claims.

I claim the following invention:

1. A system using a user device in communication with a stored data repository, that reduces the background noise from a speech audio signal generated by a user, comprising:
    a user device, with a processor and a memory, receiving a speech audio signal; and
    a noise reduction device, in communication with a stored data repository, and in communication with said user device, is configured to:
        convert said received speech audio signal to text;
        generate synthetic speech based on a speech data corpus or speech model data of the user stored in said stored data repository and said converted text;
        determine the predicted subjective quality of the received speech audio signal if that signal were to be transmitted to a far end listener;
        determine the predicted subjective quality of said synthetic speech; and
        transmit, selectively, said speech audio signal or said synthetic speech, whichever has higher predicted quality based on a comparison between the value of objective quality metrics computed for the speech audio signal and the synthetic speech signal.

2. The claim according to claim 1, wherein said stored data repository is on said user device and or a server via a network.

3. The claim according to claim 1, wherein said received speech audio signal is a live speech audio signal.

4. The claim according to claim 1, wherein said user device is configured to pre-process said speech audio signal based on using a predetermined noise reduction algorithm.

5. The claim according to claim 1, wherein said noise reduction device is integrated with said user device.

6. A method to manufacture a system using a user device in communication with a stored data repository, that reduces the background noise from a speech audio signal generated by a user, comprising:
    providing a user device, with a processor and a memory, receiving a speech audio signal; and
    providing a noise reduction device, in communication with a stored data repository, and in communication with said user device, is configured to:
        convert said received speech audio signal to text;
        generate synthetic speech based on a speech data corpus or speech model data of the user stored in said stored data repository and said converted text;
        determine the predicted subjective quality of the received speech audio signal if that signal were to be transmitted to a far end listener;
        determine the predicted subjective quality of said synthetic speech; and
        transmit, selectively, said speech audio signal or said synthetic speech, whichever has higher predicted quality based on a comparison between the value of objective quality metrics computed for the speech audio signal and the synthetic speech signal.

7. The claim according to claim 6 wherein said stored data repository is on said user device and or a server via a network.

8. The claim according to claim 6, wherein said received speech audio signal is a live speech audio signal.

9. The claim according to claim 6, wherein said step of receiving said speech audio signal by said user device further comprises pre-processing said speech audio signal based on using a predetermined noise reduction algorithm.

10. The claim according to claim 6, wherein said noise reduction device is integrated with said user device.

11. A method to use a system using a user device in communication with a stored data repository, that reduces the background noise from a speech audio signal generated by a user, comprising:
- receiving a speech audio signal with a user device, said user device further comprises a processor and a memory; and
- providing a noise reduction device, in communication with a stored data repository, and in communication with said user device, is configured to:
  - convert said received speech audio signal to text;
  - generate synthetic speech based on a speech data corpus or speech model data of the user stored in said stored data repository and said converted text;
  - determine the predicted subjective quality of the received speech audio signal if that signal were to be transmitted to a far end listener;
  - determine the predicted subjective quality of said synthetic speech; and
  - transmit, selectively, said speech audio signal or said synthetic speech, whichever has higher predicted quality based on a comparison between the value of objective quality metrics computed for the speech audio signal and the synthetic speech signal.

12. The claim according to claim 11, wherein said stored data repository is on said user device and or a server via a network.

13. The claim according to claim 11, wherein said received speech audio signal is a live speech audio signal.

14. The claim according to claim 11, wherein said step of receiving said speech audio signal further comprises pre-processing said speech audio signal based on using a predetermined noise reduction algorithm.

15. The claim according to claim 11, wherein said noise reduction device is integrated with said user device.

16. A non-transitory program storage device readable by a computing device that tangibly embodies a program of instructions executable by the computing device to perform a method to use a system using a user device in communication with a stored data repository, that reduces the background noise from a speech audio signal generated by a user, comprising:
- receiving a speech audio signal with a user device, said user device further comprises a processor and a memory; and
- providing a noise reduction device, in communication with a stored data repository, and in communication with said user device, is configured to:
  - convert said received speech audio signal to text;
  - generate synthetic speech based on a speech data corpus or speech model data of the user stored in said stored data repository and said converted text;
  - determine the predicted subjective quality of the received speech audio signal if that signal were to be transmitted to a far end listener;
  - determine the predicted subjective quality of said synthetic speech; and
  - transmit, selectively, said speech audio signal or said synthetic speech, whichever has higher predicted quality based on a comparison between the value of objective quality metrics computed for the speech audio signal and the synthetic speech signal.

17. The claim according to claim 16, wherein said stored data repository is on said user device and or a server via a network.

18. The claim according to claim 16, wherein said received speech audio signal is a live speech audio signal.

19. The claim according to claim 16, wherein said step of receiving said speech audio signal further comprises pre-processing said speech audio signal based on using a predetermined noise reduction algorithm.

20. The claim according to claim 16, wherein said noise reduction device is integrated with said user device.

* * * * *